United States Patent [19]

Ackerman et al.

[11] Patent Number: 4,603,414

[45] Date of Patent: Jul. 29, 1986

[54] APPARATUS FOR MAKING A DATA RECORD CARRIER

[75] Inventors: Richard Ackerman, Fremont, Calif.; Ronald Bergsten, Palmyra; Alan A. Jewer, Ft. Atkinson, both of Wis.

[73] Assignee: News Log International, Janesville, Wis.

[21] Appl. No.: 466,328

[22] Filed: Feb. 14, 1983

[51] Int. Cl.$^4$ .............................................. G11B 7/00
[52] U.S. Cl. ..................... 369/118; 369/119; 369/125; 369/59; 358/345
[58] Field of Search ...................... 369/44, 59, 97, 111, 369/112, 118, 119, 125, 100; 358/345

[56] References Cited

U.S. PATENT DOCUMENTS

| | | | |
|---|---|---|---|
| 3,672,779 | 6/1972 | Hock | 356/138 |
| 3,806,643 | 4/1974 | Russell | 369/125 |
| 3,898,629 | 8/1975 | Westerberg | 369/125 X |
| 4,122,551 | 10/1978 | Urbach | 369/119 X |
| 4,416,001 | 11/1983 | Ackerman et al. | 369/97 X |

*Primary Examiner*—Robert L. Richardson
*Attorney, Agent, or Firm*—Thomas R. Vigil

[57] ABSTRACT

The camera or data recording apparatus (30) consists of an optical system for creating a data record on a photosensitive medium and includes a laser (36) for generating a light beam and mirrors (62, 72, 74 and 82) for transmitting the light beam to a final light beam path (56e) which is rotated about an axis (63) parallel spaced from the final light beam path (56e). Further the camera (30) includes an assembly (38) for shaping and focusing the light beam to have a bar shape cross section which is directed to the rotating final light beam path and imaged onto a photosensitive medium (86). A modulator (58, 60) modulates the light beam from the laser (36) intermittently to image or record light beam bar shape cross sections defining data in an arcuate path (14) on the photosensitive medium (86), a computer (32) controls the modulator (58, 60) and a carriage (88) is provided for moving the photosensitive medium (86) toward and away from the axis (63) about which the final light beam (56e) rotates.

74 Claims, 12 Drawing Figures

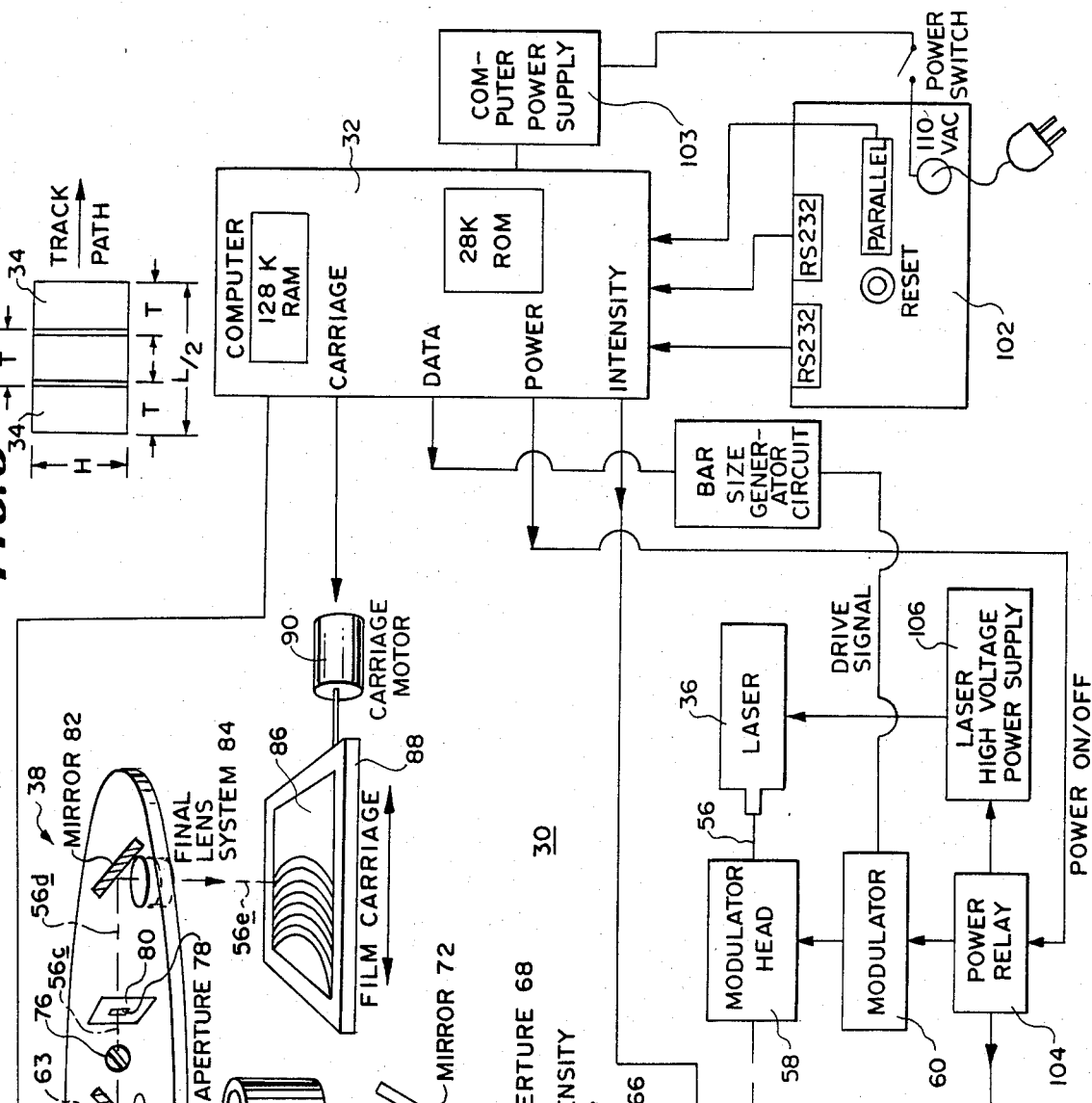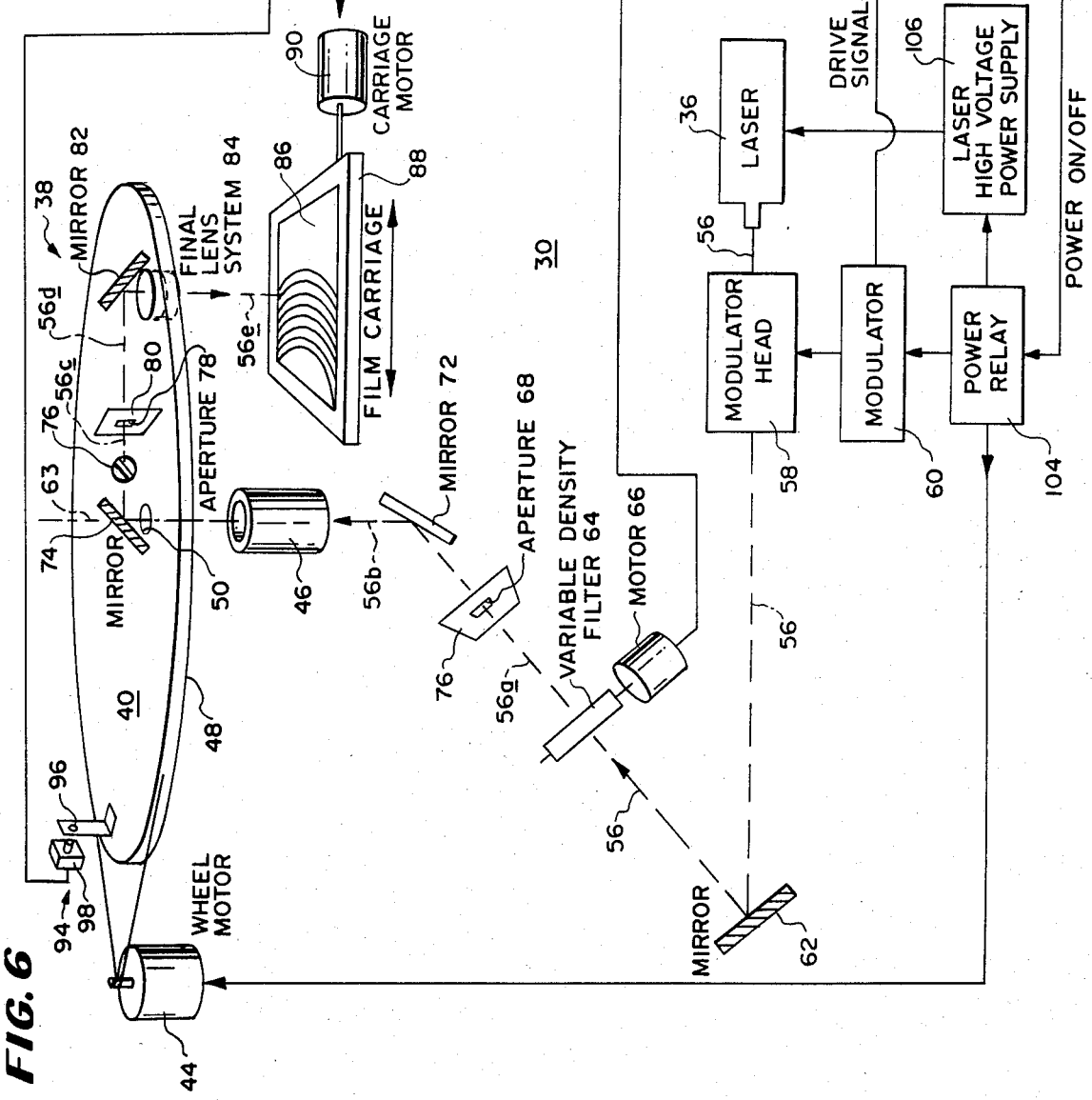

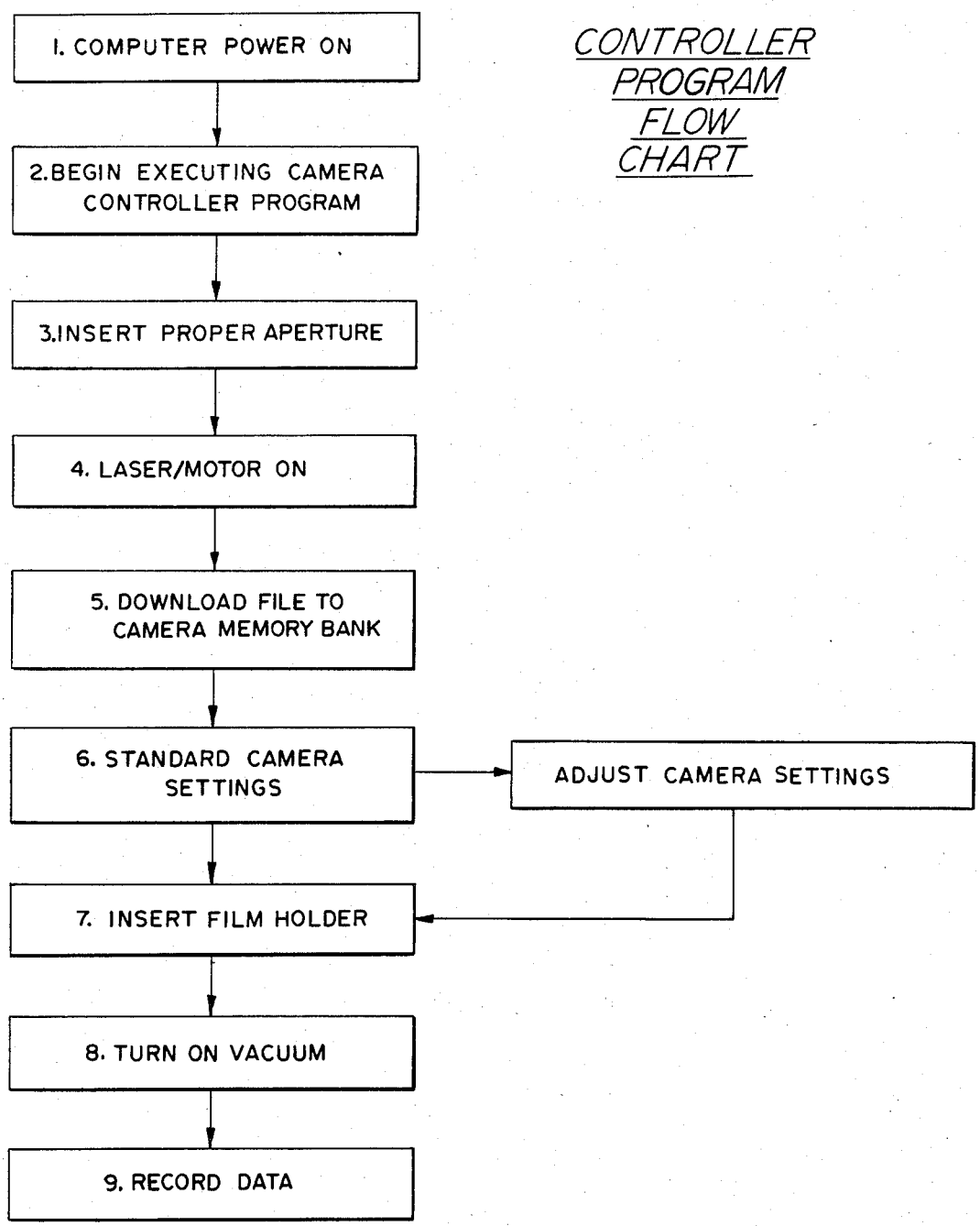

APPARATUS FOR MAKING A DATA RECORD CARRIER

TECHNICAL FIELD

The present invention relates to a camera or data recording apparatus and to a method for using same for creating a data record carrier on a photosensitive medium.

BACKGROUND ART

Heretofore various cameras and camera systems have been proposed for imaging, photographing or recording data in the form of light areas and dark areas on a photosensitive medium with the light and dark areas corresponding to information data in binary form, i.e., the dark areas or dots and the light areas corresponding to 1's and 0's (or 0's and 1's).

Such photosensitive medium or negative or positive can then be used as a data record carrier itself or can be used as a mask for the printing of data record carriers therefrom which can have transparent or translucent and opaque areas, e.g., opaque background and transparent dots, or reflective and non-reflective areas such as reflective background and non-reflective areas or dots.

Examples of cameras or photographic systems for optically recording data on a photosensitive medium are disclosed in the following U.S. patents:

| U.S. PAT. NO. | PATENTEE |
| --- | --- |
| 3,179,924 | Auyang et al. |
| 3,198,880 | Toulon |
| 3,330,182 | Gerber et al. |
| 3,501,586 | Russell |
| 3,564,120 | Taylor |
| 3,624,284 | Russell |
| 3,765,743 | Reaves et al. |
| 3,806,643 | Russell |
| 3,898,629 | Westerberg |
| 3,983,317 | Glorioso |
| 4,094,010 | Pepperl et al. |
| 4,094,013 | Hill et al. |

An early example of a photographic data storage system is disclosed in U.S. Pat. No. 3,179,924. Here digital data in the form of light areas and dark areas is stored on a strip of film 10.

Then, a photographic disk reproduction system for television signals is disclosed in U.S. Pat. No. 3,198,880 and a device for exposing discrete positions of a photosensitive surface to a variable density light beam is disclosed in U.S. Pat. No. 3,330,182.

Further, it has been proposed in the Russell U.S. Pat. No. 3,501,586 to provide dots of data in a spiral track on a photosensitive medium in an analog to digital to optical photographic recording and playback system. The later Russell U.S. Pat. Nos. 3,624,284 and 3,806,643 disclose similar optical systems for encoding binary type data on a medium.

In U.S. Pat. No. 3,564,120 it is proposed to provide an image construction system with arcuately scanning drop generators wherein an image to be reproduced is repetitively optically scanned along successive arcuate lines and the density variations are converted to transmittable digital signals.

In U.S. Pat. No. 3,898,629 directed to an apparatus for scanning a data record medium, there is disclosed a binary data recording system for recording binary information in the form of dots on a photographic film using a laser which directs a laser beam through a modulator. The modulated beam is transmitted through a hollow shaft to a mirror which directs the light outwardly in a hollow arm which is rotated about the axis of the hollow shaft and which has at the end thereof another mirror for reflecting light into a light path which is parallel spaced from the axis of the hollow shaft and which light path moves in a circular or arcuate path about the axis of the hollow shaft. With this arrangement, binary information can be printed on a photographic plate which is movable toward and away from the axis of rotation of the hollow shaft.

U.S. Pat. No. 3,983,317 discloses an astigmatizer for a laser recording and reproducing system where data in the form of grooves are formed by a laser in concentric recording tracks on a disk.

Other optical data recording systems for an optical multichannel digital disk storage system and/or for an optical storage disk system with disk track guide sectors are disclosed in U.S. Pat. Nos. 4,094,010 and 4,094,013.

Still further, laser systems for recording data in digital format on a digital record such as a photographic plate or reflective plate is disclosed on page 30 of the August, 1979 issue of "LASER FOCUS".

The camera of the present invention utilizes a laser and modulator with the laser beam being directed through a hollow shaft to a mirror in a manner somewhat similar to the system disclosed in U.S. Pat. No. 3,898,629.

However, as will be described in greater detail hereinafter, the camera of the present invention includes a light beam shaping a focusing assembly for creating a light beam image bar that forms a building block for building rectangular or square half cells or full cells which are utilized in the forming of recorded digital data bits in a data bit stream in an arcuate track on a photosensitive medium.

SUMMARY OF THE INVENTION

According to the present invention there is provided a method for imaging or recording data in the form of a full cell or a half cell along a line forming a data track on a photosensitive medium utilizing a light beam and an aperture having a bar shape, comprising the step of: imaging the cross section of the light beam at the aperture having a bar shape onto said medium.

Also according to the invention there is provided a photosensitive medium having bar images reorded thereon by the method described above.

Further according to the invention there is provided a method for creating a data record on a photosensitive medium using a data recording apparatus, said method comprising the steps of: generating a light beam from a fixed source, transmitting said light beam to a final light beam path, rotating the final light beam path about an axis parallel spaced from the final light beam path, shaping and focusing the light beam to have a bar shape cross section which is directed to the final light beam path and imaged onto a photosensitive medium, and modulating said light beam thereby to intermittently image or record light beam bars defining data in an arcuate path on the photosensitive medium.

Also according to the invention there is provided a data record carrier made by the method described above.

Still further according to the invention there is provided a data recording apparatus for creating a data record on a photosensitive medium, said data recording apparatus comprising means for generating a light beam from a fixed source, means for transmitting said light beam to a final light beam path which is rotated about an axis parallel spaced from the final light beam path, means for shaping and focusing the light beam to have a bar shape cross section which is directed to the rotating final light beam path and imaged onto a photosensitive medium, means for modulating said light beam thereby to intermittently image record light beam bars defining data in an arcuate path on the photosensitve medium, and means for controlling said modulating means.

BRIEF DESCRIPTION OF DRAWINGS

FIG. 5 is a view of ½ of a cell formed by imaging or recording three bars by the camera of the present invention onto a photosensitive medium.

FIG. 6 is a schematic, block, electrical, optical and mechanical diagram of the camera of the present invention.

FIG. 12 is a flow chart of the camera controller program utilized by the computer of the camera of the present invention in imaging the data to be recorded on a photosensitive medium.

BEST MODE FOR CARRYING OUT THE INVENTION

Figure 1:
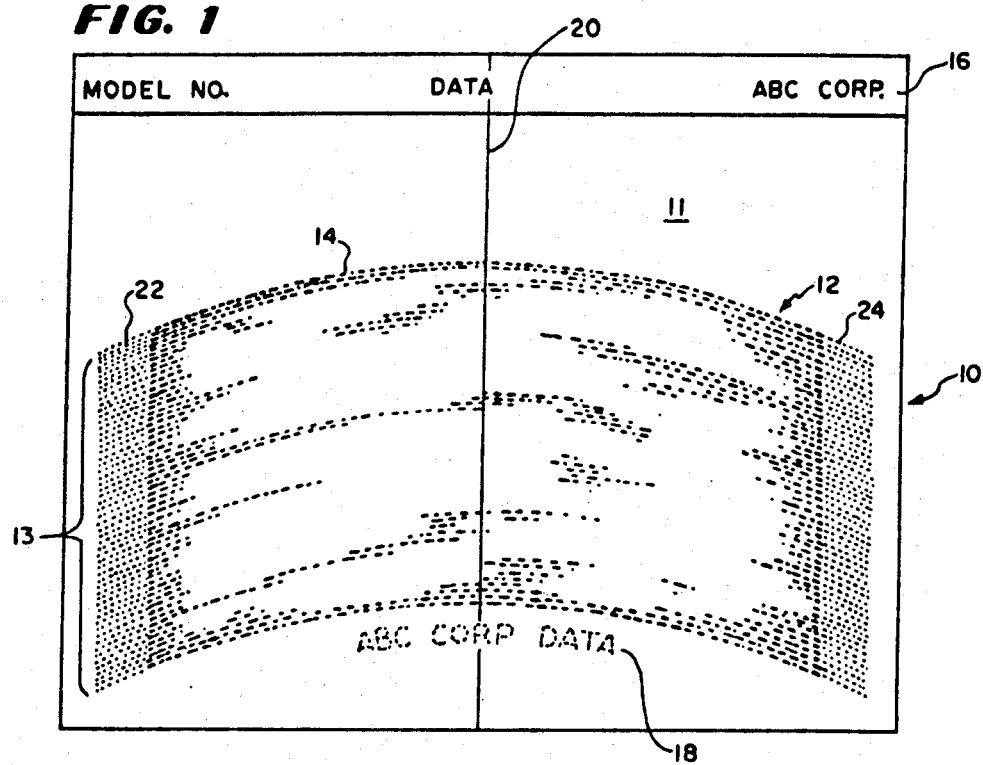
FIG. 1 is a plan view of the data record carrier constructed by the method of, and with the camera of, the present invention.

Referring now to the drawings in greater detail there is illustrated in FIG. 1 a data record carrier 10. The data record carrier 10 includes a substrate 11 which can be made from a number of different materials. For example, it can be made from paper, paperboard, coated enamel paper, plastic filament paper, vinyl, Mylar TM, Kodalith Pan TM, Tri-X Pan TM, dry silver, Tri-X TM, diazo, vesicular material or print plates.

In one preferred embodiment, the substrate 11 is made of film negative or positive material and a mask or master of photosensitive material forming the data record carrier 10 is made photographically with a camera or data recording apparatus 30 (FIG. 6) of the present invention to be described in greater detail hereinafter. The data 12 is represented by transparent or clear areas and dark or opaque areas. A preferred size of this master negative is approximately 4 inches by 6 inches, which is the standard size for microfiche negatives.

Once a mask data record carrier 10 has been made, such mask can be reproduced or utilized for printing inexpensive data record carriers 10 on an inexpensive substrate 11 material such as paper or paperboard material.

In the case of a data record carrier 10 which has a substrate 11 made from photosensitive material, data 12 is optically encoded therein in the form of a plurality 13 of tracks 14 utilizing photographic techniques.

In this respect, and as will be described in greater detail hereinafter, the camera 30 is utilized to create cells 15 (FIGS. 2 and 3) in each track 14 where each cell 15 has a predetermined length L (FIG. 2) along the direction of the track and a predetermined width W (FIGS. 2 and 3) transverse to the direction of the track 14. Each cell 15 is transparent or opaque or portions thereof are transparent or opaque to define a certain logic state in the cell 15.

When a mask data record carrier 10 is made, such a mask can be utilized for the printing of data record carriers 10 on a paper or paperboard substrate 11.

When the data 12 is printed, the cells 15 can be either white or black to form reflective or non-reflective cells 15 or half white and half black to form partially reflective and partially non-reflective cells 15 to represent different logic states, namely logic 0 or logic 1.

The substrate 11 can also have printed thereon other pertinent data in a header section 16.

In the embodiment shown in FIG. 1, the data record carrier 10 shown is utilized for storing information relating to a parts list, price list, and other pertinent data relative to a product sold under a particular model number by a particular company. Other data or a repeat of the data in the header section 16 can also be printed on the substrate 11 beneath the data 12 in the same manner the cells 15 of each track 14 are printed as shown at 18 in FIG. 1.

Figure 3:
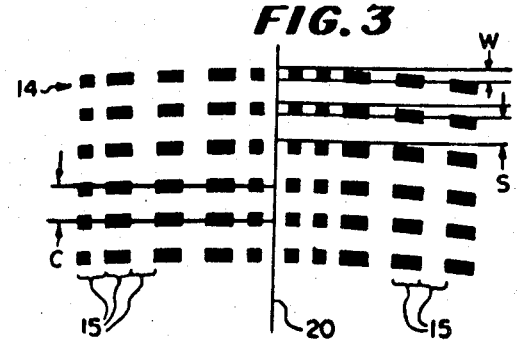
FIG. 3 is an enlarged view of the center portion of the data tracks shown in FIG. 1.

As will be described further in connection with the description of FIGS. 3 and 4, when the data record carrier 10 is formed on a photosensitive substrate 11, each cell 15 will have a given cell length L and a given cell width W and will represent one form of logic, logic 0 or logic 1. Such a cell 15 can be completely transparent or completely opaque. In such a cell 15, there is no transition across the length of the cell and such cell is referred to as a non-transition cell and in this description will correspond to a logic 0 data bit.

Then, for other cells, which will be characterized as containing a logic 1 data bit, part of the cell extending in a direction transverse to the direction of the track 14 will be opaque and the remaining part of the cell extending transverse to the direction of the track 14 will be transparent or·vice versa. As a result, there is a transition intermediate and typically midway across the length L of the cell 15 from transparent to opaque or opaque to transparent. As a result, an optical reader having a light source which passes light directly, or via fiber optics, to the substrate 11 of the data record carrier 10 as the reader is moving arcuately along a track 14 will sense no transition along a cell 15 length L but will sense a transition (opaque to transparent or vice versa) when there is a transition intermediate the edges of a cell 15. Such optical information is converted to electrical signals by a photosensor moving with the reading head and sent to a microprocessor which has been programmed to sense when there has been a transition over the length of a cell 15 and to then generate a corresponding logic 0 or logic 1 data bit of information which is supplied to a random access memory.

It is important to note, however, that data is encoded in the form of a transition or a non-transition in each cell 15 so that there is no lost space between the cells 15 and the cells 15 can be made as small as present technology permits.

Referring again to FIG. 1, it will be apparent that each of the tracks 14 is arcuate and such tracks are created by moving camera 30 in an arcuate path. As taught in U.S. Pat. No. 4,532,616 each of the tracks 14 has the same radius and this radius is constant over the length of the track 14. Also, each track 14 of the plurality 13 of tracks 14 are spaced apart from one another a predetermined distance S (FIG. 3) with each track 14 extending in an arcuate manner across the substrate 11 of the data record carrier 10 so as to be arranged in a nested manner, again with each track 14 having the same radius.

In this way, the data record carrier 10 can be positioned on a carrier or transporter of a reader and once proper alignment has been obtained, the data record carrier 10 can be indexed along an axis 20 which is co-linear with a line that extends across the data record carrier 10 and is co-linear with a radial line that includes the center of curvature of each data track 14.

In reading data from the data record carrier 10, a rotating reader or scanner head will rotate over the first track 14 on a rotation thereof picking up and reading the data encoded on the track 14 and then while the reading head or scanner is completing a revolution around its rotating axis, the data record carrier 10 is indexed along the line or axis 20 a distance S from the first track 14 to the second track 14 and so on for each successive track 14.

When the data record carrier 10 substrate 11 is made of a non-energy transmissive material, such as a paper or paperboard material, and the data 12 is optically encoded in the cells 15 by forming a non-transition logic 0 cell 15 with a fully reflective or fully non-reflective surface and a transition logic 1 cell 15 with a portion of the cell 15 being reflective and another portion being nonreflective, then the reader will be of the type which directs light onto the surface of the data record carrier 10 and which has a sensor adjacent the point of light emission for sensing reflected light from reflective areas.

From empirical tests and experiments with different substrate materials, different sizes of substrates, different cell widths, different cell lengths, and different radii for the tracks a number a parameters have been determined. For example, it has been determined that a very useable data record carrier 10 is provided when the track 14 radius is between 4 and 18 inches and that a preferred radius for each track 14 is somewhere between 8 and 12 inches.

Also it has been determined empirically that for a track radius of between 4 and 18 inches, the arc subtended by the track can be between 120° and 30°.

More specifically, for tracks 14 having a radius of somewhere between 8 and 12 inches, a preferred arc subtended by the track 14 is 60° wherein at least 45° of the arc of the track 14 contains information data.

Figure 2:
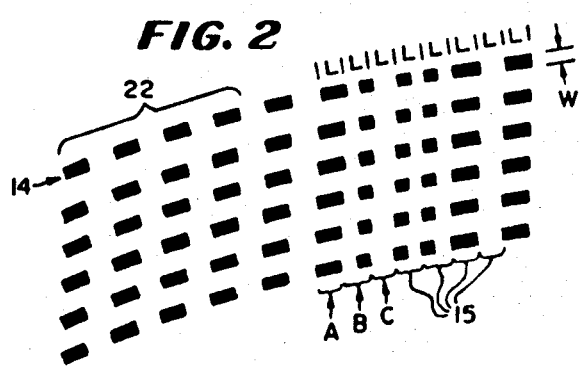
FIG. 2 is an enlarged view of the lower left hand corner of the data tracks formed on and in the substrate of the data record carrier shown in FIG. 1.

Referring now to FIG. 2 there is illustrated therein the beginning of the first six tracks 14 shown at the lower left hand corner of the plurality 13 of tracks 14 on the substrate 11 of the data record carrier 10 in FIG. 1.

Typically, at the beginning and at the end of each track 14, a leader 22 and a tailer 24 are provided, each composed of a series of non-transition logic 0 cells 15 where no transition occurs across the length L of each cell 15. Thus, the length L of each cell 15 would be fully non-reflective (or opaque) or fully reflective (or transparent) and would alternate that way until an address portion of the track 14 is reached.

As shown in FIG. 2, the beginning of the track address is shown with four logic 0 cells, the first one being a fully transparent (or transmissive) cell 15, the next one being a fully non-reflective (or opaque) cell 15, etc. through cell A. Then there is shown a transition cell B which has the first portion thereof reflective (transmissive) and a second portion thereof non-reflective (opaque). The next cell C is a logic 0 cell and is fully reflective (or transmissive). The succeeding cells 15 are a transition cell the first portion of which is non-reflective (opaque) and the second portion of which is reflective (transmissive) followed by another transition cell 15 and then two non-transition cells 15.

It has been determined empirically that a useful cell length L for optically encoded data is between 0.002 inch and 0.020 inch. A cell length L which is preferred with respect to high compacting of data and which provides a sufficient cell length to facilitate encoding and reading of the data 12 is approximately 0.006 inch. The width W of each cell 15, which is not drawn to scale in FIGS. 2 and 3, can be between 0.0007 inch and 0.010 inch. A very suitable cell width dimension W in the direction extending transverse to the direction of the track has been found to be from 0.002 inch to 0.008 inch.

It has also been found empirically that a very suitable spacing S for the nested arcuate tracks 14 is a dimension which is 10 to 30 percent of the width W.

Thus, the spacing S taken along the center line or axis 20 on which the tracks 14 are arranged or nested as shown in FIG. 1 can be as small as 0.0002 inch.

As further empirical tests are made and advances are made in microtechnology techniques, further compression may be available. Presently a center-to-center track spacing C of between 0.002 inch and 0.011 inch with a track width or thickness between 0.0015 and 0.008 inch have been found empirically to be practical and workable dimensions.

It will be appreciated that the spacing between the tracks 14 at the beginning of the tracks 14 and at the ends of the tracks 14 will be less than the spacing S in the middle along line 20. In fact, if one were to extend the tracks 14 another 60°, a total of 90° from either side of the line 20, they would converge toward each other and eventually intersect. Thus, although the arcuate tracks 14 appear to be parallel spaced, they are, in reality, equal radii tracks that are arranged in a nested array with a spacing in one embodiment of between 0.007 and 0.010 inch from each other at the place (along the line 20) of maximum spacing.

Figure 4:
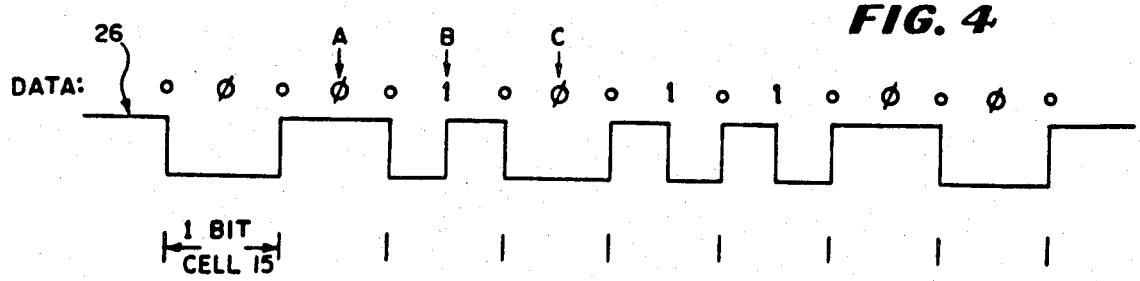
FIG. 4 is a graph of the electrical signal generated by the light energy transmitted or reflected or not transmitted or not reflected across each cell of several cells in one of the tracks shown in FIG. 2 with the corresponding logic state stored in the cell indicated thereabove.

In FIG. 4 is shown a waveform 26 of the electrical signal generated from an optical reading of the data in the first track 14 shown in FIG. 2. Here it is apparent that a fully transmissive or reflective cell 15 corresponds to a data bit of logic 0 in that cell 15. Thus, starting with a first cell 15 which is identified as cell A, there is a fully non-transmissive (opaque) or fully non-reflective surface thereon on a substrate 11 such that there is no transition across the length L of the cell as a reader passes along that track 14 over that cell A and the logic of that data bit is logic 0.

Then, the next cell B is partially transmissive or reflective and partially non-transmissive or non-reflective so as to cause a square waveform in signal 26 for cell B. This corresponds to a logic 1 data bit as shown. The next cell C is a non-transition cell C which is fully transmissive or fully reflective. The succeeding cells 15 shown in FIG. 4 are transition, transition, non-transition, non-transition and non-transition.

It is to be appreciated that by establishing logic in the form of a transition or non-transition over a given cell length L, such as a cell length of 0.006 inch, the optically encoded data 12 in the track 14 on or in the substrate 11 of the data record carrier 10 can have a wide degree of tolerance with respect to the sharpness or fuzziness of cell edges or the point of transition in the cell 15. In other words, the data 12 can be tolerant of a lot of noise. In this respect, it is not essential that a transition take place within a very confined area of the cell length L. As a result, the position of the cell edge or the position of a transition in a cell or the sharpness of either can vary up to at least 25% of the desired intended location of the cell edge or transition with the data still being highly readable. In this respect, the beginning of the non-reflective area of cell A could be 25% to the left or right of the beginning edge of cell A and the optical sensing and resulting electrical signal generated by the optical sensing would still be able to indicate to a microprocessor that there was no transition over the major length of the cell and that therefore the data bit stored in cell A is logic 0.

Likewise, if the transition in a transition cell such as the cell B occurs somewhere to the right or left of the middle of the cell B, up to at least 25% on either side of the middle of cell B, there will still be a transition over the length L (timewise and distancewise) of cell B to indicate to a microprocessor that a logic 1 data bit is stored in cell B.

As a result, by utilizing the optical transition or non-transition across a cell length L for encoding logic values in the cells 15, i.e., a logic 0 or logic 1, a very efficient and effective data record carrier 10 is provided.

Further in this regard, cell spacing is not required since the microprocessor is only concerned with the transition. Thus a series of logic 0 cells 15 are defined by alternating fully reflective (transmissive) and fully non-reflective (non-transmissive) cells 15 and transition cells for the other form of logic, namely logic 1, are identified by any cell where there is a transition between a reflective (transmissive) area and a non-reflective (non-transmissive) area within a cell 15 across the length L of the cell 15.

Additionally, and as noted above, since transitions are being sensed within a cell 15, the cell edge for a non-transition cell 15 or the position of transition within a cell 15 for a transition cell 15 need not be precise and fuzziness and inaccuracy in the position of such transition can be tolerated at least up to 25% of the intended location of the cell edge or position of transition within the cell 15. This makes the optically encoded data very tolerant to noise and very tolerant of errors in printing, or even inaccuracies in the location of printing of a cell edge or transition in a cell 15. The data record carrier 10 is also tolerant of substrate dimensional changes, such as, but not limited to, thermal, chemical, or mechanical changes. It is also tolerant of localized or universal changes to the substrate, such as, for example, changes due to moisture.

In creating a data record carrier 10 one will first select a track spacing C and then a track path on the substrate 11 which is defined by the radius of the track 14 and the arc to be subtended by the track 14.

Next a cell length L in the direction of the track 14 is selected for each bit of data to be stored in each cell 15 on each track 14. Then a cell or width or track width dimension W transverse to the direction of the track 14 is selected.

Then, one selects a non-transition cell 15 for one form of logic, such as logic 0, to be stored in each non-transition cell 15 and a transition cell 15 for the other form of logic, e.g., logic 1, to be stored in each other transition cell for the other form of logic, e.g., logic 1.

Next depending upon the data to be encoded, a computer 32 (FIGS. 6 and 7) associated with the camera 30 (FIG. 6) for making a data record carrier 10 on film or photosensitive material is programmed to direct or not direct a light beam, such as a laser light beam, onto the film emulsion while the laser light beam is rotating through the specified arc to be subtended by the track 14.

After a first track 14 is formed or encoded, the camera 30 is indexed a track spacing C and the above procedure is repeated.

In practicing the method for printing a data record carrier 10 of alternating reflective and non-reflective areas for cells 15 on a substrate 11, a mask or master of photosensitive material is utilized to print alternating dark or non-reflective areas and light or reflective areas on the paper substrate 11.

Also it is to be noted that it is immaterial whether the printing is identical to the mask or master or the reverse of the mask or matter since it is the occurrence of a transition over a cell length L which is important and not whether the cell 15 is light (white) or dark, i.e., reflective or non-reflective.

Furthermore, the camera 30 can be used for direct exposure of a final data record, if copies are not needed.

In accordance with the teachings of the present invention, there is provided a method for photographically creating a data record on a photosensitive medium (e.g., substrate 11) and a camera 30 for carrying out the method. The camera 30 and its method of use are described below in detail in connection with the description of FIGS. 5–12.

In accordance with the method and with reference to FIG. 5, each half cell portion of a cell 15 will be created from focused rectangular images or bars 34 which each have a height H (FIG. 5) that extends transverse to the path of each track 14, i.e., has a height H equal to the width W of the cells 15, and a thickness T.

Typically, each half cell created by the camera 30 on the photosensitive medium will comprise 3 to 6 bars 34 and can comprise up to 15 bars when it is desired to have low density (large physical size) cells 15.

The height H of each bar 34 can vary between 0.0015 inch and 0.008 inch. The thickness T of each bar can vary between 0.0002 inch and 0.002 inch.

In FIG. 5 there is shown a half cell with a length of L/2 which is made up of three bars 34 that overlap such that the length L/2 is less than the thickness T times three. This enables one to make certain that the half cell is made solidly transparent (or opaque when printed from the photosensitive medium) over the length L/2. However, it has also been found empirically that good half cell images are also obtained with abutting/juxtaposed bars 34. Also one suitable bar thickness T is 0.0006 inch.

Referring now to FIG. 6 there is illustrated therein a block or schematic layout of the camera 30 which is constructed and operated in accordance with the teachings of the present invention. Although referred to herein as a camera 30, the apparatus comprising same can be referred to as a system for photographically creating images on a photosensitive medium.

A feature of the camera 30 shown in FIG. 6 is the provision therein of a stationarily mounted laser 36 which supplies laser light to a rotationally mounted image shaping and focusing assembly 38. As shown, assembly 38 includes a wheel, disk or circular platform 40 (hereinafter disk 40) which is rotatably mounted on a table 42 (FIGS. 10 and 11) that is mounted in a cabinet or housing 43 (FIG. 7) of the camera 30 and which is driven by a wheel or disk motor 44.

Figure 10:
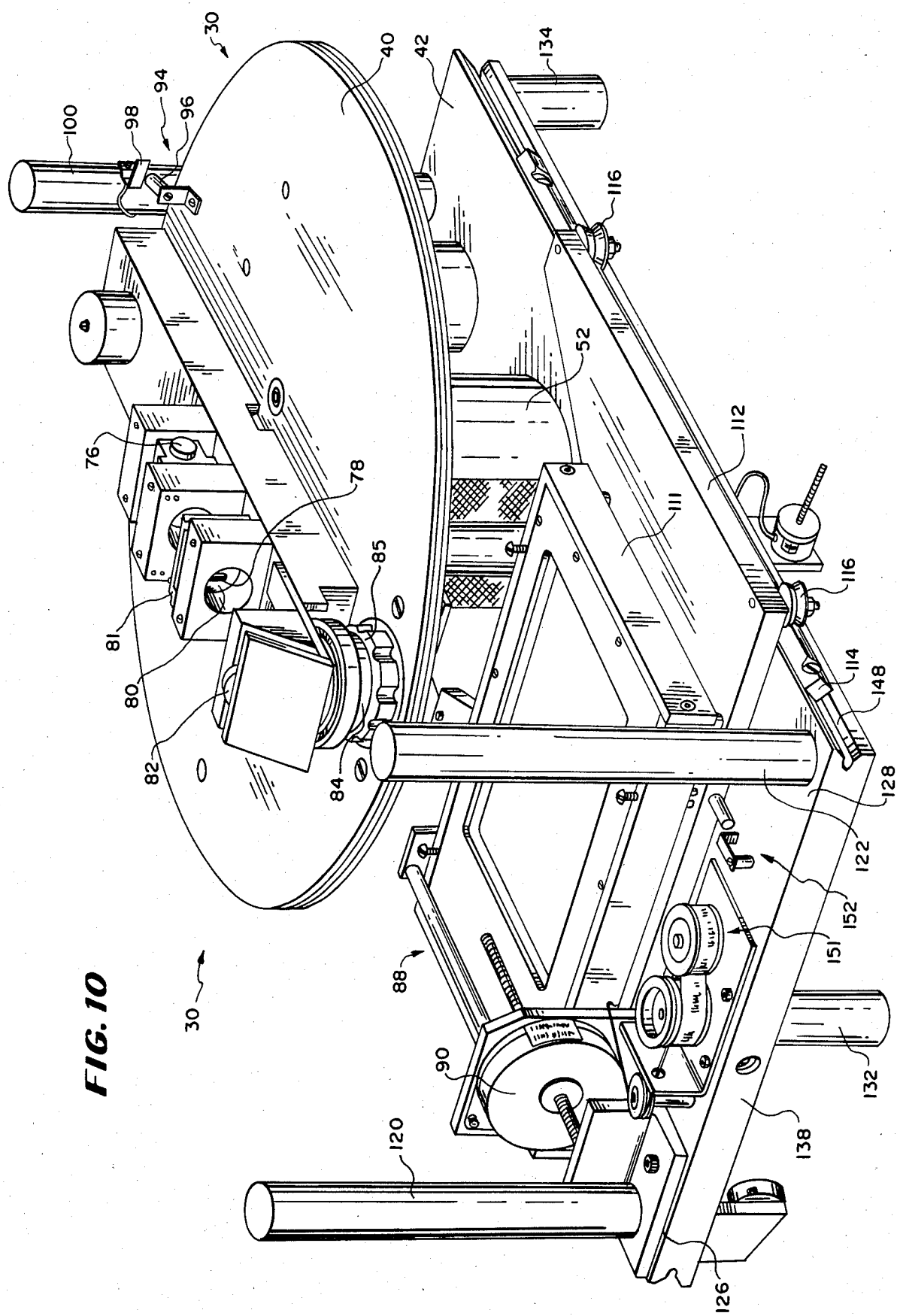
FIG. 10 is a top perspective view of the mechanical and optical components of the camera of the present invention.

The disk 40 has a hollow sleeve 46 fixed to the underside 48 thereof and concentric with the center of the disk 40 and about a central opening 50 therein. This sleeve 46 is rotatably journalled in a larger cylinder 52 (FIG. 10) which is fixed to and which extends above the table 42 (FIG. 10). In the drawings the sleeve 46 is shown as extending up to and being fixed to the underside of the disk 46 around the opening 50. However, in a prototype, the sleeve 46 actually extends through and above the disk 40 and is fixed thereto.

The lower part of the sleeve 46 extends through an opening (hidden from view in FIG. 10) in the table 42 and is rotatably mounted beneath the table 42 by a bearing 54.

With the hollow sleeve 46 rotatably mounted in the cylinder 52, an axial path is provided for a light beam 56 from the laser 36, which is mounted on the underside of the table 42, to the image shaping and focusing assembly 38.

Figure 11:
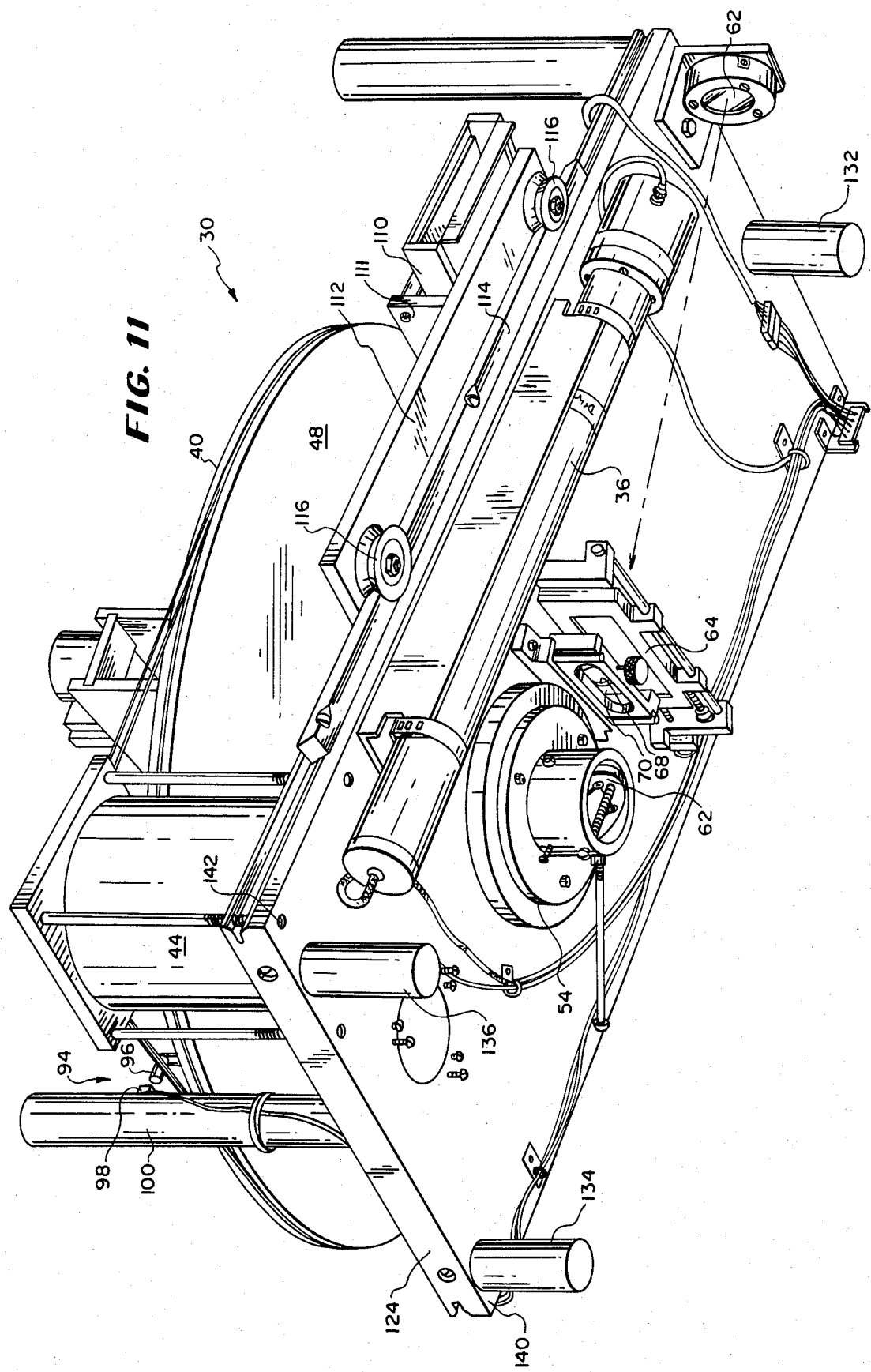
FIG. 11 is a bottom prespective view of the mechanical and optical components of the camera of the present invention.

As shown in FIG. 6, the light beam 56 of coherent light travels from the laser 36 through a modulator head 58, which functions as an electrical light shutter that is driven by a modulator 60 and controlled by computer 32, to a mirror 62. The mirror 62 is adjustably mounted as shown in FIG. 11 and directs the reflected light beam 56 toward the axis 63 of rotation of the sleeve 46 and disk 40 and to and through a variable density filter 64, commonly referred to as wedge 64, driven by a motor 66 controlled by computer 32. The intensity can be varied at the recording medium, for example, between $1 \times 10^3$ foot candles and $1 \times 10^{10}$ foot candles. The wedge or filter 64 is used to adjust or vary the intensity of the light beam so that an altered light beam 56a of a desired intensity is then directed from the wedge 64 to and through aperture 68 in a light shielding plate 70 and to an adjustably mounted mirror 72 positioned under the sleeve 46 where the light beam 56b intersects the axis 63 of rotation of the sleeve 46.

The plate 70 serves to block out all but the light beam 56b passing through the aperture 68, i.e., all the diverging light, and directs the light beam 56b to the mirror 72.

The mirror 72 then reflects the light beam 56b upwardly to a mirror 74 fixedly mounted over the opening 50 and forming part of the image shaping and focusing assembly 38 which further includes a cylindrical lens 76, a shaping aperture 78 in a plate 80 received in a holder 81, a further fixed mirror 82 and a final lens focusing system 84 having an adjustment or focusing collar 85 (FIG. 10) all mounted in spaced apart relationship on disk 40.

As shown, the light beam 56b is directed to and through the cylindrical lens 76 which divergently oblongates the beam 56b to fully and uniformly illuminate the shaping aperture 78 with a beam 56c which is divergently oblongated. A divergent shaped beam 56d from the aperture 78 is then dircted to the mirror 82 which is situated over the final lens focusing system 84.

According to the teachings of the present invention the aperture 78 has a width of 0.001 to 0.010 inch and a height of from 0.010 to 0.040 inch. One preferred width is 0.003 inch and one preferred height is 0.010 inch.

The resulting shaped light beam 56d is then reflected by the mirror 82 through the final lens focusing system 84 which preferably has a magnification of 1/5 and a resulting imaged final light beam 56e which has been reduced by a factor of five from the beam 56d is directed onto a photosensitive medium such as a film, plate, or photosensitive paper 86 supported on and carried by a film carriage 88 drive by a carriage motor 90. Stated otherwise, the cross section of the light beam 56d at the aperture 78 is imaged (by the 1/5 magnification of light beam 56d) on the photosensitive medium 86.

In operation, photosensitive medium 86 is inserted through a slot 92 (FIG. 8) in the cabinet 43 onto the carriage 88. The computer 32 can then be operated to cause the motor 90 to position the carriage 88 for an arc of photographing—recording of data—by the camera 30 on the medium 86. The computer 32 knows when to start each track 14 by the sensing of the position of the lens system 84 of the camera 30. This is accomplished by sensing a signal from a magnet/switch assembly 94 comprising a magnet 96 mounted on the disck 40 and a Hall effect switch 98 mounted on a leg or post 100 (FIG. 6) which generates a signal when the magnet 96 passes same. Then, upon receiving the signal, the computer 32 knows where the lens system 84 is located and can operate the modulator 60 to cause exposure of a predetermined number of predetermined sized bars 34 in a desired sequence to form a stream of data bits in tracks 14 on the photosensitive medium 86 as will be described further below in connection with the description of FIG. 12.

As shown in FIG. 6, an interface circuit board 102 is provided for coupling a computer power supply 103 to an A.C. source thereby to supply power to the computer 32 which in turn supplies power to a power relay 104 that supplies the wheel or disk motor 44, the modulator 60 and a laser high voltage power supply 106, all of which are conventional.

The computer 32 can be realized by a single computer board having a microprocessor and the laser 36 can be realized by a helium-neon continuous gas laser.

It will be understood that after a track 14 has been photographed or recorded on the photosensitive medium 86, the computer 32 will operate the carriage motor 90 to advance the carriage 88 a distance equal to a desired center-to-center distance C (FIG. 3) between adjacent tracks to position the photosensitive medium 86 for the recording or photographing of the next track.

Figure 7:
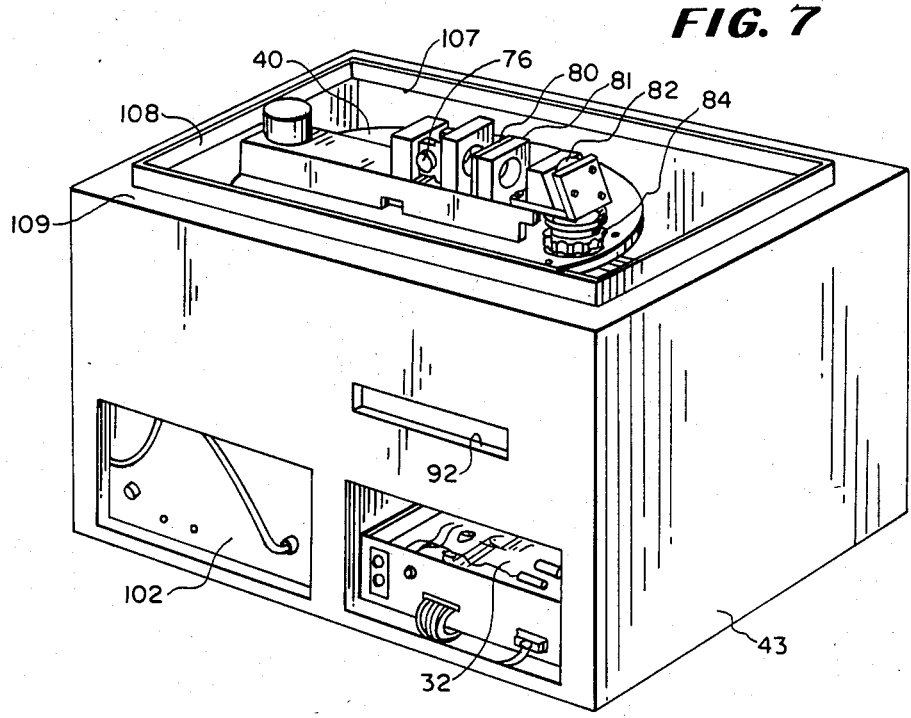
FIG. 7 is a perspective view of the camera of the present invention mounted in a cabinet therefor.

Referring now to FIG. 7 the cabinet 43 in which the camera 30 is mounted has a top opening 107 therein surrounded by an upstanding rim 108 that extends upwardly from a marginal top wall portion 109 and that is adapted to receive a cabinet cover (not shown) thereon.

Figure 8:
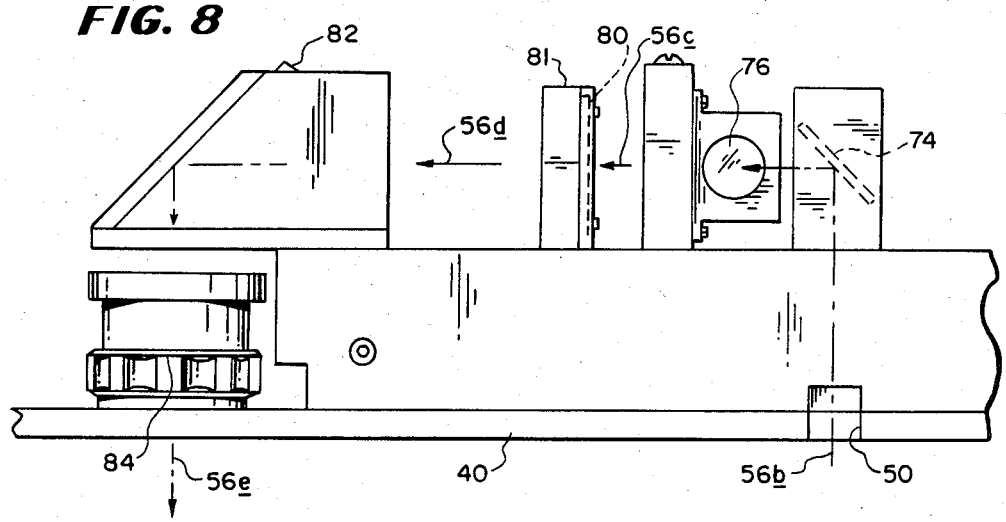
FIG. 8 is a side elevational view of the light beam shaping and focusing assembly of the camera of the present invention.

FIG. 8 is a side view of the image shaping and focusing assembly 38 and shows the opening 50 in table 42 through which the light beam 56b passes upwardly to impinge upon mirror 70 where it is reflected as shown to cylindrical lens 76 then through aperture 78 in a removable and replaceable plate 80 to a mirror 82 where it is reflected downwardly through lens system 84 from which it exits as light beam 56e.

Figure 9:
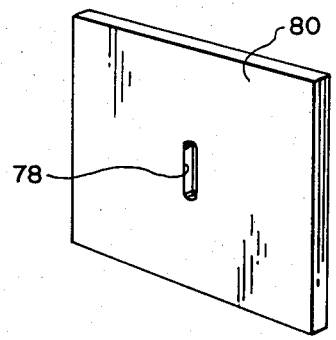
FIG. 9 is a perspective view of an aperture plate that is mounted in the shaping and focusing assembly shown in FIG. 8.

One plate 80 is shown in FIG. 9. Again the aperture 78 in plate 80 can have a height between 0.010 and 0.040 inch and a width between 0.001 and 0.010 inch. The particular size aperture 78 chosen will depend on the size of the bars 34 to be photographed—recorded on the film negative 86 or other photosensitive material.

Turning now to FIGS. 10 and 11 it will be apparent that the carriage 88 includes a film holder 110 (FIG. 11) received in a compartment 111 mounted on a platform 112 which travels on side rais 114 mounted on the sides of table 42 by means of depending wheels 116. The carriage 88 is moved forwardly and rearwardly by rotation of a rotor (not shown) which is mounted in motor 90 and which has a threaded bore that is received on a fixed threaded shaft 118. This causes the motor 90, and the carriage 88 on which it is mounted, to move inwardly or outwardly of to or from the center of the table 42, i.e., axis 63 (FIG. 6).

The table 42 has three upwardly extending legs or posts 100, 120 and 122 which extend upwardly from table end 124 (FIG. 11) and corners 126 and 128, respectively of table 42 and which fit beneath and can be secured to the underside of the marginal top wall portion 109 (FIG. 8) of the cabinet 43 (FIG. 7) and three alternately arranged downwardly extending legs or posts 132, 134 and 136 which depend from table end 138 and table corners 140 and 142 (FIG. 11) of table 42 respectively to the floor (not shown) of cabinet 43 and can be fixed thereto.

Preferably, and as shown in FIGS. 10 and 11, the side edges 144 and 146 of the table 42 have U shaped grooves 148 and 150 therein to receive a diamond (square) cross section rail 114 which is fixed thereon. The wheels 116 are grooved and ride over an outwardly extending edge of a respective rail 114.

As shown in FIG. 10 an antibacklash tension cable and negator cable tensioner assembly 151 is mounted on table 42 and connected to carriage 88 for preventing overshoot or undershoot of carriage 88 when it is moved by motor 90. Also a Hall effect sensor and magnet assembly 152 is mounted on table 42 and carriage 88 for sensing when the carriage is in its "home" position farthest from the axis 63 and in position to receive a film holder 110.

In use of the camera 30, the wheel or disk motor 44 is driven at a speed which will rotate disk 40 at 100 to 140 revolutions per minute. One preferred rotation is 120 rpm or 2 cycles or revolutions per second.

The number of bars 34 to a half cell can be 1 to 15 as stated above and the time increment for recording or photographing bar 34 is in integral multiples of 0.125 microsecond. The length of each half cell, i.e., L/2, can be varied by varying the number of bars 34, the frequency of the imaging of the bars 34, the size of the aperture 78 and the amount of overlap of the bars 34.

With respect to the frequency of photographing or imaging of the bars 34, such frequency, namely the time of the start of imaging the next bar 34 can vary from 0.125 microsecond up to 255×0.125 microsecond or 31.87 microseconds. The off time minimizes smearing, i.e., the carry over of imaging due to the moving camera lens system 84, which smearing is preferably kept to 10% of the thickness T or less for each bar 34.

Then the camera 30 is operated in the manner indicated in FIG. 12. In this respect, FIG. 12 shows a protocol or flow diagram for operating the camera 30 which is as follows:

STEP 1. The power is turned on in power supply 103 to energize the computer 32.

STEP 2. The controller program for camera 30 then starts by first "homing" the carriage 88 to its "home" position farthest from the axis 63 of rotation of disk 40. This is sensed by Hall effect sensor and magnet assembly 152.

Also the wedge or variable density filter 64 is brought to its "home" position.

Preferably, a terminal (not shown) is coupled to the computer 32 via an RS 232 serial interface line mounted on the panel 102 so that the so-called main menu lists other menus available.

STEP 3. At this step the desired aperture 78 is chosen and the plate 80 containing same is inserted into the holder 81 (FIG. 10) therefor.

STEP 4. Power is supplied to the power relay 104 via an operator input to the computer via the terminal for energizing wheel or disk motor 44 and laser supply 106.

STEP 5. In this step the data to be photographed, imaged, or simply recorded on the photosensitive medium or other photosensitive medium is inputted to the RAM or downloaded into the RAM of the computer 32 from another computer through one of the RS 232 serial interface lines.

STEP 6. Here the camera 30 settings that must be input by the operator via the terminal are inputted. These settings include (a) the number of coded data groups per line of track, which groups can vary from 3 to 21, (b) the wedge or filter 64 setting which controls the light intensity, and (c) the track spacing C which can typically vary between 0.002 and 0.008 inch. Also, as shown, other camera settings can be adjusted such as bars 34 per half cell, cell length L, the overlap of bars 34 and the time interval or frequency between bar imaging. All the needed settings are grouped on one menu.

STEP 7. Here the operator inserts the film holder 110 through slot 92 in cabinet 43 and into compartment 111 and the holder "dark slide" is withdrawn.

STEP 8. In this step a vacuum system (not shown) associated with the carriage 88 is actuated to apply a vacuum via a vacuum hose attached to holder 110 for applying a vacuum to the underside of the sheet of photosensitive material 86, in the holder 110.

STEP 9. Here the terminal operator instructs the computer 32 to proceed to operate the camera to record human-readable information, such as the header section 18 and then to image or record the stream of desired data bits, cells 15, in each track 14.

From the foregoing description it will be apparent that the method of imaging or recording data on a photosensitive medium and the camera of the present invention provide a number of advantages, some of which are described above and others of which are inherent in the invention.

Also modifications can be made to the method and camera of the present invention without departing from the teachings of the invention. Accordingly, the scope of the invention is only to be limited as necessitated by the following claims.

We claim:

1. A method for imaging or recording data along a predetermined path on a photosensitive medium, which will define a data track, said track having a predetermined width and length, said data including generally rectangular, full cells, each having a given length along the path and generally rectangular half cells, each having one half the given length along the path, and each cell representing a logic one or logic zero data bit, utilizing a light beam and an aperture having a generally rectangular bar shape, said method comprising the steps of: imaging the cross section of the light beam at the aperture having a generally rectangular bar shape onto said medium to create half cells and full cells.

2. The method of claim 1 including the step of creating on said medium a half cell of data comprising one or more generally rectangular, bar images.

3. The method of claim 2 including the step of creating on said medium a full cell of data having twice the length along the data track, of a half cell.

4. The method of claim 3 including the step of creating alternating imaged half cells or full cells of data along the line forming a data track with the alternate half or full cells being defined by non-light beam exposed portions on said medium, each non-light beam exposed portion having a length along the line of a half cell or a full cell.

5. The method of claim 4 wherein said line is an arcuate line along which an arcuate track is formed.

6. The method of claim 5 wherein a plurality of spaced apart arcuate lines or tracks of data are formed on said medium.

7. The method of claim 6 wherein said tracks are of equal radii and are arranged in a spaced apart nested array.

8. The method of claim 7 wherein the arcuate tracks of data are created with a spacing between tracks at the center of the tracks from approximately 0.002 inch to approximately 0.011 inch.

9. The method of claim 1 wherein each imaged half cell is comprised of 1 to 15 imaged light beam bars of generally rectangular shape.

10. The method of claim 9 wherein each imaged half cell is comprised of between three and six generally rectangular bars.

11. The method of claim 1 wherein each imaged half cell is defined by at least two imaged light beam bars generally rectagular shape.

12. The method of claim 11 wherein said imaged light beam, generally rectangular, bar shape cross sections abut each other.

13. The method of claim 11 wherein each imaged light beam, generally rectangular, bar shape cross section partially overlaps adjacent imaged, generally rectangular, light beam bars on said medium.

14. The method of claim 1 wherein said imaged light beam cross section is a cross section of a divergently oblongated beam that is directed at the aperture.

15. The method of claim 1 wherein the height of each bar is between approximately 0.002 inch and approximately 0.008 inch.

16. The method of claim 1 wherein the thickness of each bar is between approximately 0.0002 inch and approximately 0.0020 inch.

17. The method of claim 1 wherein each generally rectangular, bar image is imaged or recorded on said medium for a time period of from approximately 0.125 microsecond to approximately 1.875 microsecond.

18. The method of claim 1 wherein the time period between imaging or recording of each light beam generally rectangular, bar shape cross section image is from approximately 0.125 microsecond to approximately 31.875 miroseconds.

19. The method of claim 1 wherein the imaging or recording of said imaged light beam generally rectangular, bar shaped cross sections to form alternate half cells and/or full cells is accomplished by intermittently focusing a light beam that is moving in an arcuate path transverse to the light beam onto said medium.

20. The method of claim 19 wherein said beam is rotated at a radius of from approximately 4 inches to approximately 8 inches at a rotational speed of 100 to 140 revolutions per minute.

21. The method of claim 20 wherein said medium is advanced toward the axis of rotation of said beam a distance equal to a desired center-to-center spacing between tracks after each sweep of said light beam across said medium with intermittent imaging and focusing thereof on said medium to record said generally rectangular, bars in a manner to form half cells and cells of data which together form a stream of data bits and before the next sweep to position said medium for a succeeding sweep of said light beam for a predetermined series of sweeps thereby to record a plurality of tracks in an arcuate nested array on said medium.

22. The method of claim 21 wherein said light beam is modulated by an electric shutter type device which is operated by a controller that instructs the modulator when to pass or not pass light to image or record or not image or record a light beam generally rectangular, bar image on said medium in accordance with a menu or program of the data to be created in cells and half cells by the imaging or recording of said light beam generally rectangular, bar shape cross sections.

23. The method of claim 19 wherein said radius is approximately 6 inches and said rotational speed is approximately 120 revolutions per minute.

24. The method of claim 19 wherein said light beam is a laser light beam which is passed through a modulating device.

25. The method of claim 19 wherein said light beam is shaped by first passing it through a cylindrical lens where it is divergently oblongated, then through an aperture where it is shaped to a bar, and then through a magnifying lens system where it is focused and from which the shaped and focused light beam is directed onto said medium.

26. The method of claim 25 wherein said lens system has a magnification of 1/5 and said aperture has a height between approximately 0.010 inch and approximately 0.040 inch and a width between approximately 0.001 inch and approximately 0.040 inch.

27. A data recording apparatus for creating a data record on a photosensitive medium, said data recording apparatus comprising means for generating a light beam from a fixed source, means for transmitting said light beam to a final light beam path which is rotated about an axis parallel spaced from the final light beam path, means for shaping and focusing the light beam to have a generally rectangular, bar shape cross section which is directed to the rotating final light beam path and imaged onto a photosensitive medium, means for modulating said light beam thereby to intermittently image or record generally rectangular, light beam bars defining data in an arcuate path on the photosensitive medium, and means for controlling said modulating means.

28. The data recording apparatus of claim 27 including means for rotating said final light beam path.

29. The data recording apparatus of claim 28 wherein said control means comprise a computer which controls energization of said light source, said modulating means and rotation of said fixed light beam path.

30. The data recording apparatus of claim 29 including means for moving the photosensitive medium controlled by said computer.

31. The data recording apparatus of claim 29 including means for varying the intensity of the light beam controlled by said computer.

32. The data recording apparatus of claim 29 including means for sensing the position of the rotating focused light beam path coupled to said computer.

33. The data recording apparatus of claim 27 including means for intermittently moving the photosensitive medium to enable recording of a plurality of arcuately nested tracks of data thereon, said moving means being operated by said control means.

34. The data recording apparatus of claim 27 wherein said shaping and focusing means include means for divergently oblongating the light beam from said source.

35. The data recording apparatus of claim 34 wherein said means for oblongating is a cylindrical lens.

36. The data recording apparatus of claim 34 including means positioned in the path of travel of the divergently oblongated light beam for shaping the oblongated light beam into a generally rectangular, bar.

37. The data recording apparatus of claim 36 wherein said shaping means is a positionable plate with a generally rectangular, bar shaped aperture therein.

38. The data recording apparatus of claim 37 wherein said aperture has a height between approximately 0.010 inch and approximately 0.040 inch and a width between approximately 0.001 inch and approximately 0.010 inch.

39. The data recording apparatus of claim 36 wherein said shaping and focusing means include a final lens system through which the generally rectangular bar shape cross section light beam is focused onto a photosensitive medium.

40. The data recording apparatus of claim 39 wherein said lens system has a magnification of approximately 1/5.

41. The data recording apparatus of claim 27 including means for controlling the intensity of the light beam.

42. The data recording apparatus of claim 41 wherein said light beam source is a laser.

43. The data recording apparatus of claim 42 wherein said light beam intensity control means include a variable density filter for controlling the intensity.

44. The data recording apparatus of claim 27 including a disk on which is mounted said shaping and focusing means, means for rotating said disk, and means for sensing the position of said disk.

45. The data recording apparatus of claim 44 wherein said transmitting means include means for reflecting the light beam from said light beam source upwardly through a central opening in said disk, first reflecting means on said disk for receiving and reflecting the light beam to said shaping and focusing means, and second reflecting means on said disk for directing the light onto the photosensitive medium.

46. The data recording apparatus of claim 45 wherein said shaping and focusing means include a lens system on said disk between said second reflecting means and the photosensitive medium.

47. The data recording apparatus of claim 45 wherein said focusing and shaping means include means for divergently oblongating the light beam and means for shaping the oblongated light beam to have a generally rectangular, bar shape cross section before it is reflected and focused onto the photosensitive medium.

48. The data recording apparatus of claim 45 wherein said means for transmitting light from said light beam source include a first mirror positioned to reflect light from the light source to a second mirror positioned to focus light through said opening in said disk, a variable density filter positioned between said mirrors in the light beam path therebetween and a shielding plate with an aperture therein positioned in the light path between said filter and said second mirror.

49. A method for creating a data record on a photosensitive medium using a data recording apparatus, said method comprising the steps of: generating a light beam from a fixed source, transmitting said light beam to a final light beam path, rotating the final light beam path about an axis parallel spaced from the final light beam path, shaping and focusing the light beam to have a generally rectangular bar shape cross section which is directed to the final light beam path and imaged onto a photosensitive medium, and modulating said light beam thereby to intermittently image or record generally rectangular, light beam bars defining data in an arcuate path on the photosensitive medium.

50. The method of claim 49 including intermittently moving the photosensitive medium to enable recording of a plurality of arcuately nested tracks of data thereon.

51. The method of claim 49 wherein said shaping and focusing means include means for oblongating the light beam from said source.

52. The method of claim 51 wherein said means for oblongating is a cylindrical lens.

53. The method of claim 51 including means positioned in the path of travel of the divergently oblongated light beam for creating a light beam cross section in the shape of a generally rectangular, bar.

54. The method of claim 53 wherein said shaping means is a positionable plate with a generally rectangular, bar shaped aperture therein.

55. The method of claim 1 wherein said aperture has a height between approximately 0.010 inch and approximately 0.040 inch and a width between approximately 0.001 inch and approximately 0.010 inch.

56. The method of claim 53 wherein said shaping and focusing means include a final lens system through which the generally rectangular, bar shape cross section light beam is focused onto the photosensitive medium.

57. The method of claim 56 wherein said final lens system has a magnification of approximately 1/5.

58. The method of claim 49 including controlling the intensity of the light beam.

59. The method of claim 58 wherein said light beam is a laser and the intensity is controlled.

60. The method of claim 49 generally rectangular wherein 1 to 15 bars are recorded to form a half cell of data.

61. The method of claim 49 wherein 3 bars are recorded to form a half cell of data.

62. The method of claim 49 wherein at least 2 generally rectangular, bars are recorded to form one half cell and the rectangular, bars overlap at their edges to ensure a solid composite recording of the half cells.

63. A data record carrier comprising: a photosensitive substrate; at least one data track on said substrate; and a plurality of generally rectangular data cells on said track including full cells having a given length along said track and half cells having one half the given length along said track, each cell representing a logic one or a logic zero data bit, adjacent cells having different light transmissiveness or different light reflectiveness and the non-transmissive or non-reflective cells, half or full, being created on said photosensitive substrate by one or two generally rectangular bar-shaped images, respectively, imaged onto said photosensitive substrate along the length of said track.

64. The data record carrier of claim 63 wherein each imaged half cell is comprised of 1 to 15 imaged bars of generally rectangular shape.

65. The data record carrier of claim 63 wherein each imaged half cell is comprised of between 3 and 6 generally rectangular bars.

66. The data record carrier of claim 63 wherein each imaged half cell is defined by at least two imaged bars of generally rectangular shape.

67. The data record carrier of claim 66 wherein each said imaged, generally rectangular, bar abuts an adjacent bar.

68. The data record carrier of claim 66 wherein each said imaged, generally rectangular, bar partially overlaps an adjacent imaged bar on said substrate.

69. The data record carrier of claim 63 wherein said data track is arcuate to form an arcuate track.

70. The data record carrier of claim 69 comprising a plurality of spaced-apart, arcuate tracks of data on said substrate.

71. The data record carrier of claim 70 wherein said tracks are of equal radii and are arranged in a spaced apart nested array along a common center line of said tracks.

72. The data record carrier of claim 71 wherein the arcuate tracks of data having a spacing between tracks at the center of the tracks, and along the common center line, from approximately 0.002 inch to approximately 0.011 inch.

73. The data record carrier of claim 63 wherein the height of each generally rectangular bar is between approximately 0.002 inch and approximately 0.008 inch.

74. The data record carrier of claim 63 wherein the thickness of each bar is between approximately 0.002 inch and approximately 0.0020 inch.

* * * * *